US009088158B2

(12) United States Patent
Maggio et al.

(10) Patent No.: US 9,088,158 B2
(45) Date of Patent: Jul. 21, 2015

(54) REVERSE VOLTAGE CONDITION PROTECTION IN A POWER SUPPLY SYSTEM

(71) Applicant: TEXAS INSTRUMENTS INCORPORATED, Dallas, TX (US)

(72) Inventors: Kenneth J. Maggio, Dallas, TX (US); Umar Jameer Lyles, Palm Bay, FL (US); John H. Carpenter, Jr., Palm Bay, FL (US); J. Randall Cooper, Lucas, TX (US); Vinod Mukundagiri, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 7 days.

(21) Appl. No.: 14/097,990

(22) Filed: Dec. 5, 2013

(65) Prior Publication Data
US 2014/0160600 A1    Jun. 12, 2014

Related U.S. Application Data

(60) Provisional application No. 61/734,821, filed on Dec. 7, 2012, provisional application No. 61/736,469, filed on Dec. 12, 2012, provisional application No. 61/740,319, filed on Dec. 20, 2012.

(51) Int. Cl.
H02H 3/00        (2006.01)
H02H 3/18        (2006.01)

(52) U.S. Cl.
CPC . *H02H 3/18* (2013.01); *H02H 3/003* (2013.01)

(58) Field of Classification Search
USPC ................................................ 361/56, 86, 87
See application file for complete search history.

(56) References Cited

U.S. PATENT DOCUMENTS

| | | | |
|---|---|---|---|
| 6,628,489 B1 * | 9/2003 | Pardoen et al. | 361/84 |
| 2008/0023768 A1 * | 1/2008 | Alberkrack et al. | 257/355 |
| 2008/0225454 A1 * | 9/2008 | Wotruba et al. | 361/82 |

* cited by examiner

*Primary Examiner* — Danny Nguyen
(74) *Attorney, Agent, or Firm* — William B. Kempler; Frank D. Cimino

(57) ABSTRACT

One embodiment includes a power system. The system includes a power switch device that is activated to provide an output voltage to a load in response to an input voltage. The power switch device includes a control terminal and a bulk connection. The system also includes a reverse voltage control circuit configured to passively couple the input voltage to one of the control terminal and the bulk connection in response to a reverse voltage condition in which an amplitude of the input voltage becomes negative. The system further includes an output shutoff circuit configured to passively couple the output voltage to a neutral-voltage rail during the reverse voltage condition.

22 Claims, 3 Drawing Sheets

US 9,088,158 B2

REVERSE VOLTAGE CONDITION PROTECTION IN A POWER SUPPLY SYSTEM

CROSS-REFERENCE TO RELATED APPLICATION

This application claims the benefit of U.S. Provisional Patent Application 61/734,821 filed on 7 Dec. 2012, entitled "POWER SWITCH", and claims the benefit of U.S. Provisional Patent Application 61/736,469 filed on 12 Dec. 2012, entitled "GATE CONTROL CIRCUITRY FOR NEGATIVE INPUT VOLTAGES USING A SINGLE FET FOR BLOCKING OPERATIONS", and claims the benefit of U.S. Provisional Patent Application 61/740,319 filed on 20 Dec. 2012, entitled "BODY CONTROL CIRCUITRY FOR A SINGLE FET USED IN BLOCKING OPERATIONS", the entirety of each of the above-identified applications is incorporated by reference herein.

TECHNICAL FIELD

This disclosure relates generally to electronic circuit systems, and more specifically to reverse voltage condition protection in a power supply system.

BACKGROUND

Power supply systems can be implemented in a variety of electronic devices for providing an output voltage to provide power to one or more circuit components in the electronic device. As an example, a power supply system can be implemented to provide power via a universal serial bus (USB), such as for charging a battery of a wireless device. A given power supply system can include a power switch that is activated to provide an output voltage based on an input voltage. However, in response to a reverse voltage condition, such as resulting from a decrease of the input voltage to an amplitude of less than zero volts, current can flow backward from the output voltage to the input voltage through the power switch. Such reverse voltage condition can break down internal parasitic diodes within the power switch, thus damaging the power switch. Additionally, the current flow from the output voltage can drain power from the load, such as discharging the battery of a device that is connected to a given USB port for charging.

SUMMARY

One embodiment includes a power system. The system includes a power switch device that is activated to provide an output voltage to a load in response to an input voltage. The power switch device includes a control terminal and a bulk connection. The system also includes a reverse voltage control circuit configured to passively couple the input voltage to one of the control terminal and the bulk connection in response to a reverse voltage condition in which an amplitude of the input voltage becomes negative. The system further includes an output shutoff circuit configured to passively couple the output voltage to a neutral-voltage rail during the reverse voltage condition.

Another embodiment includes a power supply system. The system includes a power switch device that is activated to provide an output voltage to a load in response to an input voltage. The power switch device includes a control terminal. The system also includes a reverse voltage control circuit comprising a pair of transistors that are oppositely connected in series and are each passively activated to couple the input voltage to the control terminal during a reverse voltage condition. The reverse voltage condition can correspond to a condition in which an amplitude of the input voltage becomes negative.

Another embodiment includes a power supply system. The system includes a power transistor that is activated to provide an output voltage to a load in response to an input voltage. The power transistor includes a bulk connection. The system also includes a reverse voltage control circuit comprising a pair of transistors that are oppositely connected in series and are each passively activated in response to a reverse voltage condition to couple the input voltage to the bulk connection of the power transistor. The reverse voltage condition can correspond to a condition in which an amplitude of the input voltage becomes negative.

DETAILED DESCRIPTION

Figure 1:
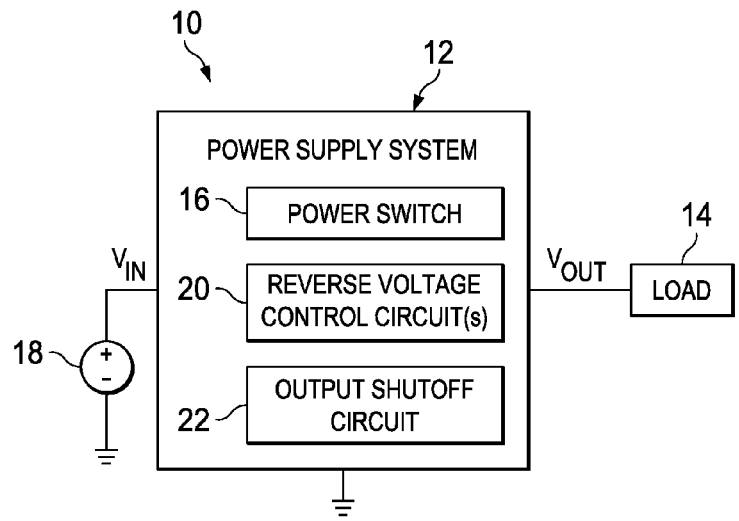
FIG. 1 illustrates an example of a power system.

This disclosure relates generally to electronic circuit systems, and more specifically to reverse voltage condition protection in a power supply system. A power supply system, such as can be implemented in a universal serial bus (USB) charging application, can include a single power switch, such as a laterally-diffused metal-oxide semiconductor (LDMOS) transistor, and at least one reverse voltage control circuit. The power switch can include a control terminal (e.g., a gate terminal) and a bulk connection (e.g., a backgate connection), and can provide an output voltage to a load, such as a battery or battery charging circuit, via an input voltage. The reverse voltage control circuit can be configured to passively couple the input voltage to one of the control terminal or the bulk connection in response to a reverse voltage condition in which the input voltage becomes negative (e.g., slightly less than zero volts). As an example, a reverse voltage condition can occur as a result of a reverse USB connection in which the USB plug is improperly inserted into a USB receptacle. In response to detecting such a reverse USB connection, the power switch can maintain a deactivated state to protect the power switch from damage and to prevent a reverse current path through the power switch, such as resulting in discharging power from the load (e.g., from a battery). Additionally, an output shutoff circuit can be configured to passively activate in response to the bulk connection being coupled to the input voltage at a reverse voltage condition, to couple the output voltage to a neutral-voltage rail (e.g., ground), such as to prevent a floating voltage potential at the output voltage from breaking down the power switch.

As an example, the power supply system can include a reverse voltage gate control circuit to couple the input voltage to the gate of the power switch and a reverse voltage bulk control circuit to couple the input voltage to the bulk connection of the power switch. The reverse voltage gate control circuit(s) can be configured, for example, to include a pair of transistors that are arranged oppositely in series between the input voltage and the control terminal or the bulk connection of the power switch. As described herein, the term "arranged oppositely in series" or "oppositely connected in series" with respect to transistors refers to coupling the transistors such that source or drain terminals are coupled to a common node. The pair of transistors can also have gate terminals that are coupled to a neutral-voltage rail (e.g., ground). Parasitic diodes associated with each of the transistors can have anodes that are coupled at the common node, such that one of the parasitic diodes forward biases in response to the normally-positive input voltage decreasing to an amplitude of less than zero volts. In response, the pair of transistors activates to couple the input voltage to the control terminal or to the bulk connection, thus deactivating the power switch. In addition, the pair of transistors and the power switch can be fabricated as isolated transistors (e.g., isolated LDMOS transistors), such that resultant parasitic diode connections can be provided at the drain of the respective transistors to prevent a latching current path from a substrate to the drain of the respective transistors in response to the reverse voltage condition. Accordingly, based on the passive activation of the reverse voltage control circuit and the output shutoff circuit, the power switch can be protected in a range of amplitudes of the input voltage that spans both negative and positive voltages.

FIG. 1 illustrates an example of a power system 10. As an example, the power system 10 can be implemented in universal serial bus (USB) applications, such as for providing power via a USB connection or for charging a battery via a USB connection. The power system 10 includes a power supply system 12 that is configured to provide an output voltage $V_{OUT}$ to a load 14. As an example, the load 14 can correspond to a battery or can correspond to a battery charging circuit configured to charge a battery, such as for a portable device (e.g., mobile telephone, tablet computer or other device).

The power supply system 12 includes a power switch 16, which can be configured as a laterally-diffused metal-oxide semiconductor (LDMOS) transistor. The power switch 16 can be activated to provide an output voltage $V_{OUT}$ to the load 14 based on an input voltage $V_{IN}$, demonstrated as generated via a voltage source 18 in the example of FIG. 1. As an example, the power switch 16 can be activated via an activation circuit (not shown) that provides a regulated charge pump voltage to a control terminal (e.g., a gate) of the power switch 16. For example, the power switch 16 can be configured as an N-channel transistor. Therefore, the power switch 16 can have a drain that is coupled to the input voltage $V_{IN}$, such that in response to activation, the power switch 16 can provide the output voltage $V_{OUT}$ on its source terminal.

In typical operating conditions, the input voltage $V_{IN}$ can have a positive amplitude, such as to facilitate a large amplitude current flow through the power switch 16. As an example, the input voltage $V_{IN}$ can have a positive amplitude range of up to approximately twenty volts. However, a reverse voltage condition can occur in which the input voltage $V_{IN}$ can decrease to a negative voltage (e.g., at an amplitude of at least a threshold voltage less than zero). For example, the reverse voltage condition can occur based on a reverse USB connection that reverses the polarity for the input voltage $V_{IN}$ that is supplied to the power supply system 12. A sufficiently negative amplitude of the input voltage $V_{IN}$ can result in a breakdown of the semiconductor material of a given power switch, resulting in irreparable damage to the respective power switch 16. In addition, as described herein, the reverse voltage condition is defined as the input voltage $V_{IN}$ becoming negative. As a first example, the reverse voltage condition can refer to a normally positive input voltage $V_{IN}$ becoming negative (e.g., decreasing in amplitude to a voltage that is less than zero volts). However, the reverse voltage condition can also refer to a normally negative input voltage $V_{IN}$ becoming positive (i.e., negative relative to the normally negative input voltage $V_{IN}$, and thus positive), such as increasing in amplitude to a voltage that is greater than zero volts.

To mitigate damage to the power switch 16 in response to a reverse voltage condition, the power supply system 12 also includes at least one reverse voltage control circuit 20. The reverse voltage control circuit(s) 20 is configured to passively couple the input voltage $V_{IN}$ to one of the control terminal or the bulk connection of the power switch (e.g., a transistor) 16 in response to the reverse voltage condition. Therefore, during the reverse voltage condition, the power switch 16 can be held in a deactivated state to mitigate damage to the power switch 16 and to prevent a reverse current path through the power switch 16, such as could result in draining power from the load 14 (e.g., discharging an associated battery). Thus, based on the operation of the reverse voltage control circuit(s) 20 to mitigate damage to the power switch 16 from a reverse voltage condition, the power system 10 can include the power switch 16 as a single power switch, as opposed to typical power systems that implement two power switches arranged in series to block current flow resulting from a reverse voltage condition based on parasitic diodes. As a result, the power system 10 can be fabricated to have significantly less silicon area than typical power systems that implement two series-connected power switches.

For example, the reverse voltage control circuit(s) 20 can include a pair of transistors that are arranged oppositely in series between the input voltage $V_{IN}$ and the control terminal or the bulk connection of the power switch 16, such as based on having commonly coupled source terminals. As described herein, the term "passive" with respect to the coupling of the input voltage $V_{IN}$ to the control terminal or the bulk connection of the power switch 16 is defined as automatic activation of the transistors in the reverse voltage control circuit(s) 20 in response to the decrease of the input voltage $V_{IN}$ to an amplitude of less than zero volts. Therefore, passive coupling is performed without the operation of any sort of detection circuitry that provides active signal transfer to circuit components to initiate the coupling of the input voltage $V_{IN}$ to the respective one of the control terminal or the bulk connection of the power switch 16. As a result of the passive coupling, the power system 10 can react to the reverse voltage condition in a much more rapid manner than a typical power system that implements detection circuitry to detect the reverse voltage condition and actively control deactivation of the associated power switch. While the reverse voltage control circuit(s) 20 are described herein as implementing passive coupling of the input voltage $V_{IN}$ to the control terminal or the bulk connection of the power switch 16, it is to be understood that, as an example, the reverse voltage control circuit(s) 20 could instead implement active coupling of the input voltage $V_{IN}$ to the control terminal or the bulk connection of the power switch 16.

In addition, the power supply system 12 includes an output shutoff circuit 22. The output shutoff circuit 22 can be configured to couple the output voltage $V_{OUT}$ to a neutral-voltage rail, demonstrated in the example of FIG. 1 as ground in response to a reverse voltage condition. The coupling of the output voltage $V_{OUT}$ to ground can be initiated in response to deactivation of the power switch 16. As one example, the output shutoff circuit 22 can be provided a deactivation signal (not shown) that can be logically associated with an activation signal (not shown) that is provided to activate the power switch 16. In response to the deactivation signal, the output shutoff circuit 22 can couple the output voltage $V_{OUT}$ to ground. Additionally, as another example, the output shutoff circuit 22 can also include a switch that is configured to passively couple the output voltage $V_{OUT}$ to ground in response to the reverse voltage condition. For example, the switch can be provided with a given voltage that is associated with or is affected by the reverse voltage condition (e.g., a voltage of the bulk connection), such that the switch automatically activates in response to the reverse voltage condition to couple the output voltage $V_{OUT}$ to ground. Accordingly, the output voltage $V_{OUT}$ can be substantially prevented from having a floating voltage potential that could provide a current path through the power switch 16, thus further mitigating damage to the power switch 16. While the output shutoff circuit 22 is described herein as implementing passive coupling of the output voltage $V_{OUT}$ to ground, it is to be understood that, as an example, the output shutoff circuit 22 could instead implement active coupling of the output voltage $V_{OUT}$ to ground.

Figure 2:
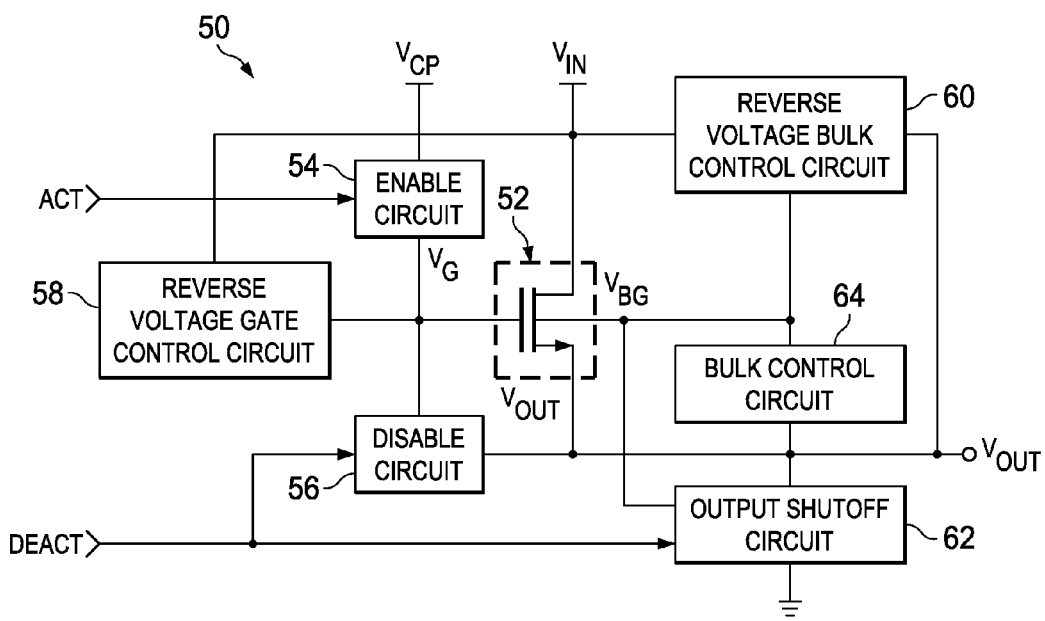
FIG. 2 illustrates an example of a power supply system.

FIG. 2 illustrates an example of a power supply system 50. The power supply system 50 can correspond to the power supply system 12 in the example of FIG. 1. Thus, the power supply system 50 can be configured to provide an output voltage $V_{OUT}$ to a load based on an input voltage $V_{IN}$. Therefore, reference is to be made to the example of FIG. 1 in the following description of the example of FIG. 2.

The power supply system 50 includes a power switch 52, which can be configured as an LDMOS transistor. The power switch 52 can be activated based on an amplitude of a gate voltage $V_G$ at a gate of the power switch 52 to provide the output voltage $V_{OUT}$ at a source of the power switch 52 via an input voltage $V_{IN}$ that is provided to a drain of the power switch 52. The power switch 52 also includes a bulk connection having a backgate voltage $V_{BG}$. In the example of FIG. 2, the power supply system 50 includes an enable circuit 54 that is configured to provide the sufficient amplitude of the gate voltage $V_G$ in response to an activation signal ACT and based on a charge pump voltage $V_{CP}$. As an example, the charge pump voltage $V_{CP}$ can be a regulated voltage that is greater than the input voltage $V_{IN}$ at a normal operating condition. As described herein, "normal operating condition" describes a condition at which the input voltage $V_{IN}$ is positive to provide a sufficient amplitude of the output voltage $V_{OUT}$ for the load 14, and is thus not in a reverse voltage condition. Therefore, in response to the activation signal ACT, the enable circuit 54 can increase the gate voltage $V_G$ to a sufficient amplitude to activate the power switch 52 to provide the output voltage $V_{OUT}$ based on the input voltage $V_{IN}$.

Similarly, the power supply system 50 includes a disable circuit 56 that is configured to deactivate the power switch 52 in response to a deactivation signal DEACT, which can be logically associated with the activation signal ACT. Therefore, as an example, in response to assertion of the deactivation signal DEACT, and thus de-assertion of the activation signal ACT, the enable circuit 54 can decouple the gate voltage $V_G$ from the charge pump voltage $V_{CP}$ and the disable circuit 56 can set a relative magnitude of the gate voltage $V_G$ and the output voltage $V_{OUT}$ to deactivate the power switch 52.

As described previously, in normal operating condition, the input voltage $V_{IN}$ has a positive amplitude, such as to facilitate a large amplitude current flow through the power switch 52. However, a reverse voltage condition can occur in which the input voltage $V_{IN}$ can decrease in amplitude to less than zero volts, such as resulting from a reverse USB connection. To help protect the power switch 52, the power supply system 50 includes a reverse voltage gate control circuit 58 and a reverse voltage bulk control circuit 60. The reverse voltage gate control circuit 58 is configured to passively couple the input voltage $V_{IN}$ to the gate of the power switch 52 in response to the reverse voltage condition, thus setting the gate voltage $V_G$ substantially equal to the amplitude of the input voltage $V_{IN}$. Similarly, the reverse voltage bulk control circuit 60 is configured to passively couple the input voltage $V_{IN}$ to the bulk connection of the power switch 52 in response to the reverse voltage condition, thus setting the backgate voltage $V_{BG}$ substantially equal to the amplitude of the input voltage $V_{IN}$. Therefore, in response to the reverse voltage condition, the power switch 52 can be held in a deactivated state to mitigate damage to the power switch 52 and to prevent a reverse current path through the power switch 52, such as could result in draining power from an associated load (e.g., the load 14).

For example, each of the reverse voltage gate control circuit 58 and the reverse voltage bulk control circuit 60 can respectively include a pair of transistors that are connected oppositely in series between the input voltage $V_{IN}$ and the control terminal or the bulk connection of the power switch 52, such as based on having commonly coupled source terminals. Each of the pair of transistors in each of the reverse voltage gate control circuit 58 and the reverse voltage bulk control circuit 60 can have a gate that is coupled to the neutral-voltage rail (e.g., ground). Thus, a parasitic diode of one of the transistors in each of the reverse voltage gate control circuit 58 and the reverse voltage bulk control circuit 60 can be forward biased in response to the reverse voltage condition, thus activating the pair of transistors to couple the input voltage $V_{IN}$ to the respective gate and bulk connections. Additionally, the power switch 52 and the pair of transistors in each of the reverse voltage gate control circuit 58 and the reverse voltage bulk control circuit 60 can be fabricated as isolated transistors (e.g., isolated LDMOS transistors), such as based on deep N-well etching. As an example, the isolated transistors can be fabricated to include additional parasitic diodes that can mitigate latching current flow from a substrate to respective drains that are held at the input voltage $V_{IN}$ during the reverse voltage condition.

In addition, the power supply system 12 includes an output shutoff circuit 62 and a bulk control circuit 64. The output shutoff circuit 62 can be configured to couple the output voltage $V_{OUT}$ to ground in response to the reverse voltage condition. The coupling of the output voltage $V_{OUT}$ to ground can be initiated in response to deactivation of the power switch 52. As an example, the output shutoff circuit 62 can include a first switch that is configured to passively couple the output voltage $V_{OUT}$ to ground in response to the reverse voltage condition (e.g., based on the coupling of the input voltage $V_{IN}$ to the bulk connection of the power switch 52), and a second switch that is configured to couple the output voltage $V_{OUT}$ to ground in response to the deactivation signal DEACT.

The bulk control circuit 64 can be configured to couple the bulk connection to the source of the power switch 52, and thus setting the backgate voltage $V_{BG}$ equal to the output voltage $V_{OUT}$, during normal operating condition of the power supply system 50. However, during the reverse voltage condition, the bulk control circuit 64 can be configured to disconnect the bulk connection from the source of the power switch 52, thus allowing the input voltage $V_{IN}$ to be coupled to the bulk connection to set the backgate voltage $V_{BG}$ to be equal to the input voltage $V_{IN}$. Accordingly, the respective amplitudes of the output voltage $V_{OUT}$ and the backgate voltage $V_{BG}$ can be separate during the reverse voltage condition to maintain deactivation and protection of the power switch 52.

Figure 3:
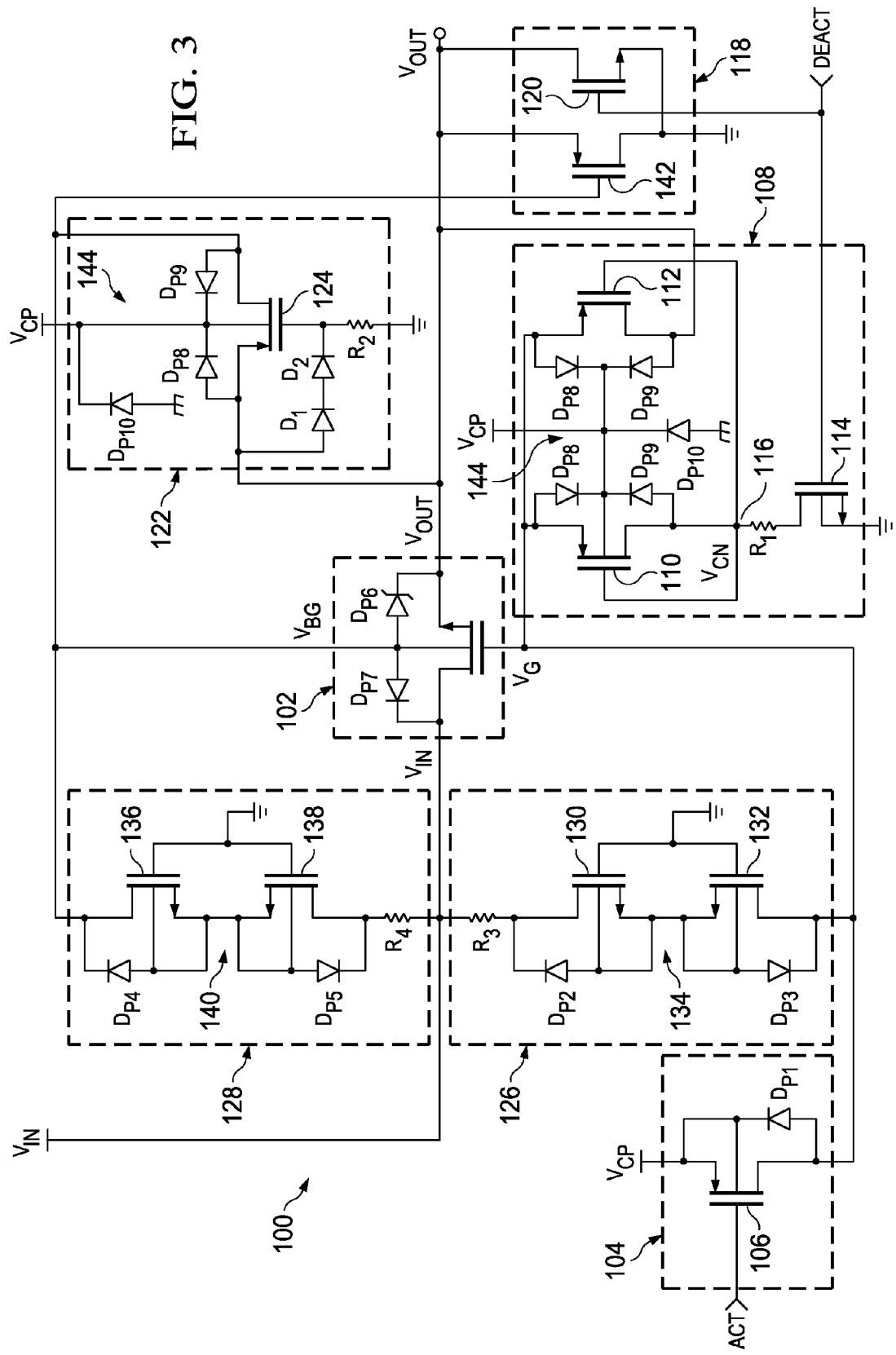
FIG. 3 illustrates an example of a power supply circuit.

FIG. 3 illustrates an example of a power supply circuit 100. The power supply circuit 100 can correspond to the power supply system 12 in the example of FIG. 1 and the power supply system 50 in the example of FIG. 2. Thus, the power supply circuit 100 can be configured to provide an output voltage $V_{OUT}$ to a load based on an input voltage $V_{IN}$. Therefore, reference is to be made to the example of FIGS. 1 and 2 in the following description of the example of FIG. 3.

The power supply circuit 100 includes a power switch 102, which can be configured as an isolated LDMOS transistor, as described herein. The power switch 102 can be activated based on an amplitude of a gate voltage $V_G$ at a gate of the power switch 102 to provide the output voltage $V_{OUT}$ at a source of the power switch 102 via an input voltage $V_{IN}$ that is provided to a drain of the power switch 102. The power switch 102 also includes a bulk connection having a backgate voltage $V_{BG}$. The power switch 102 is activated via an enable circuit 104 that includes a P-channel metal-oxide semiconductor field effect transistor (MOSFET) 106. The MOSFET 106 is activated via the activation signal ACT to provide the charge pump voltage $V_{CP}$ to the gate of the power switch 102, thus setting the gate voltage $V_G$ approximately equal to the charge pump voltage $V_{CP}$. The charge pump voltage $V_{CP}$, and thus the gate voltage $V_G$, can have a sufficient magnitude to activate the power switch 102 in response to assertion of the activation signal ACT. Additionally, the MOSFET 106 includes a parasitic diode $D_{P1}$ having a cathode coupled to a bulk and an anode coupled to the drain of the MOSFET 106. Thus, the parasitic diode $D_{P1}$ can prevent a current path from the charge pump voltage $V_{CP}$ to the gate of the power switch 102 when the MOSFET 106 is deactivated.

The power supply circuit 100 also includes a disable circuit 108 that is configured to deactivate the power switch 102 in response to the deactivation signal DEACT, which can be logically associated with the activation signal ACT. The disable circuit 108 includes a first P-channel MOSFET 110, a second P-channel MOSFET 112, and an N-channel MOSFET 114. The first P-channel MOSFET 110 is diode-connected and interconnects the gate of the power switch 102 and a control node 116, and the second P-channel MOSFET 112 has a gate coupled to the control node 116 and interconnects the gate of the power switch 102 with the source of the power switch 102. The N-channel MOSFET 114 receives the deactivation signal DEACT at its gate, has a source coupled to ground, and has a drain coupled to the control node 116 via a resistor $R_1$. Therefore, the N-channel MOSFET 114 is activated by the deactivation signal DEACT to pull down a voltage $V_{CN}$ of the control node 116 via the resistor $R_1$. Because the activation signal ACT and the deactivation signal DEACT are logically associated, the activation signal ACT no longer activates the MOSFET 106 in the enable circuit 104, and thus the decrease in the control node voltage $V_{CN}$ likewise decreases the amplitude of the gate voltage $V_G$ via the first P-channel MOSFET 110. The second P-channel MOSFET 112 activates in response to the decrease in the control node voltage $V_{CN}$, thus likewise decreasing the amplitude of the output voltage $V_{OUT}$ (e.g., approximately equal to the gate voltage $V_G$).

The power supply circuit 100 also includes a shutoff circuit 118 that includes an N-channel FET 120 that is likewise controlled by the deactivation signal DEACT. In the example of FIG. 3, the N-channel FET 120 interconnects the source of the power switch 102 and ground. Therefore, at approximately the same time that the deactivation signal DEACT decreases the amplitude of the gate voltage $V_G$ and the output voltage $V_{OUT}$ via the disable circuit 108, the deactivation signal DEACT activates the N-channel FET 120 to sink the output voltage $V_{OUT}$ to ground. Therefore, the deactivation signal DEACT provided to both the disable circuit 108 and the shutoff circuit 118 can deactivate the power switch 102 (e.g., in a normal operating condition). While the example of FIGS. 2 and 3 demonstrate that the enable circuit 108 and the shutoff circuit 118 are provided the same signal (i.e., the deactivation signal DEACT) to deactivate the power switch 102, it is to be understood that, in other examples, the enable circuit 108 and the shutoff circuit 118 can be provided separate, different signals to implement deactivation of the power switch 102.

The power supply circuit 100 also includes a bulk control circuit 122 that interconnects the bulk connection and the source of the power switch 102. During normal operating condition, the bulk control circuit 122 is configured to set the backgate voltage $V_{BG}$ approximately equal to the output voltage $V_{OUT}$. In the example of FIG. 3, the bulk control circuit 122 includes a P-channel MOSFET 124 having a source coupled to the source of the power switch 102 and a drain coupled to the bulk connection of the power switch 102. A pair of series-connected diodes $D_1$ and $D_2$ interconnect the source and the gate of the P-channel MOSFET 124, and the gate of the P-channel MOSFET 124 is interconnected with ground via a resistor $R_2$. Therefore, the P-channel MOSFET 124 is held in an activated state during normal operating condition of the power supply circuit 100 to couple the backgate voltage $V_{BG}$ of the power switch 102 and the output voltage $V_{OUT}$.

In the example of FIG. 3, the power supply circuit 100 includes a reverse voltage gate control circuit 126 and a reverse voltage bulk control circuit 128. The reverse voltage gate control circuit 126 is configured to passively couple the input voltage $V_{IN}$ to the gate of the power switch 102 in response to the reverse voltage condition, thus setting the gate voltage $V_G$ substantially equal to the amplitude of the input voltage $V_{IN}$. In the example of FIG. 3, the reverse voltage gate control circuit 126 includes a first N-channel MOSFET 130 and a second N-channel MOSFET 132 that are connected in series and arranged opposite with respect to each other between the drain (via a resistor $R_3$) and the gate of the power switch 102. The first and second N-channel MOSFETs 130 and 132 are demonstrated as having commonly coupled sources at a node 134, and each of the first and second N-channel MOSFETs 130 and 132 have a gate coupled to ground. Additionally, the first N-channel MOSFET 130 includes a parasitic diode $D_{P2}$ and the second N-channel MOSFEET 132 includes a parasitic diode $D_{P3}$.

In response to the reverse voltage condition, the input voltage $V_{IN}$ decreases to an amplitude of less than zero. As a result, the parasitic diode $D_{P2}$ becomes forward biased to provide a current flow through the resistor $R_3$ to the drain of the power switch 102 from the node 134. Thus, the voltage of the node 134 can likewise decrease to less than zero. As a result, the first and second N-channel MOSFETs 130 and 132 each activate based on the zero voltage at the respective gates being greater than the voltage at the node 134 (e.g., by greater than a threshold voltage). Accordingly, the input voltage $V_{IN}$ is coupled to the gate of the power switch 102 via the resistor $R_3$, and thus the gate voltage $V_G$ at the drain of the second N-channel MOSFET 134 is set approximately equal to the input voltage $V_{IN}$.

Similarly, the reverse voltage bulk control circuit 128 includes a first N-channel MOSFET 136 and a second N-channel MOSFET 138 that are connected in series and arranged opposite with respect to each other between the drain (via a resistor $R_4$) and the bulk connection of the power switch 102. The first and second N-channel MOSFETs 136 and 138 are demonstrated as having commonly coupled sources at a node 140, and each of the first and second N-channel MOSFETs 136 and 138 have a gate coupled to ground. Additionally, the first N-channel MOSFET 136 includes a parasitic diode $D_N$ and the second N-channel MOSFEET 138 includes a parasitic diode $D_{P5}$. Therefore, in response to the reverse voltage condition, the parasitic diode $D_{P5}$ becomes forward biased to provide a current flow through the resistor $R_4$ to the drain of the power switch 102 from the node 140, activating the first and second N-channel MOSFETs 136 and 138. Accordingly, the input voltage $V_{IN}$ is coupled to the bulk of the power switch 102 via the resistor $R_4$, and thus the backgate voltage $V_{BG}$ at the drain of the first N-channel MOSFET 138 is set approximately equal to the input voltage IN.

In the example of FIG. 3, the power switch 102 further includes a first parasitic diode $D_{P6}$, demonstrated as a Zener diode, interconnecting the bulk connection and the source from anode to cathode, and a second parasitic diode $D_{P7}$ interconnecting the bulk connection and the drain from anode to cathode. As an example, based on the fabrication of the power switch 102, the first parasitic diode $D_{P6}$ can be rated to withstand a small reverse bias voltage (e.g., approximately 7 volts) relative to the rating of the second parasitic diode $D_{P7}$ (e.g., 20 volts). However, during a reverse voltage condition, the output voltage $V_{OUT}$ can have an amplitude that is significantly greater than the input voltage $V_{IN}$, which can thus cause the first parasitic diode $D_{P6}$ to break down, resulting in damage to the power switch 102.

In addition to the coupling of the input voltage $V_{IN}$ to the gate and the bulk of the power switch 102 via the reverse voltage gate control circuit 126 and the reverse voltage bulk control circuit 128, respectively, in response to the reverse voltage condition, the shutoff circuit 118 is further configured to protect the power switch 102 in the event of the reverse voltage condition. In the example of FIG. 3, the shutoff circuit 118 also includes a P-channel MOSFET 142 that interconnects the source of the power switch 102 at a drain and ground at a source, and includes a gate that is controlled by the backgate voltage $V_{BG}$. As described previously, during the reverse voltage condition, the reverse voltage bulk control circuit 128 passively couples the input voltage $V_{IN}$ to the bulk connection of the power switch 102, thus setting the backgate voltage $V_{BG}$ approximately equal to the input voltage $V_{IN}$. As a result, the decreased magnitude of the backgate voltage $V_{BG}$ relative to the output voltage $V_{OUT}$ activates P-channel MOSFET 142, thus coupling the source of the power switch 102 to ground and setting the output voltage $V_{OUT}$ to approximately zero volts.

In addition, the P-channel MOSFETs 110 and 112 of the disable circuit 108 and the P-channel MOSFET 124 of the bulk control circuit 122 include an arrangement of parasitic diodes. In the example of FIG. 3, the arrangements of parasitic diodes include a parasitic diode $D_{P8}$ interconnecting the respective source to a common node 144, a parasitic diode $D_{P9}$ interconnecting a drain to the common node 144, and a parasitic diode $D_{P10}$ interconnecting a substrate to the common node 144. The common node 144 is held at a sufficiently high voltage amplitude to mitigate forward biasing of the parasitic diodes $D_{P8}$, $D_{P9}$, and $D_{P10}$. In the example of FIG. 3, the common node 144 is provided the charge pump voltage $V_{CP}$. However, any voltage having a sufficient magnitude can be provided to the node 144 instead.

Furthermore, the power switch 102, as well as the N-channel MOSFETs 130 and 132 in the reverse voltage gate control circuit 126 and the N-channel MOSFETs 136 and 138 in the reverse voltage bulk control circuit 128 can be fabricated to mitigate latching currents that can result from the reverse voltage condition. Therefore, the power switch 102 and the MOSFETs in each of the reverse voltage gate control circuit 126 and the reverse voltage bulk control circuit 128 can mitigate deleterious current flow to the input voltage $V_{IN}$ in the event of a reverse voltage condition.

Figure 4:
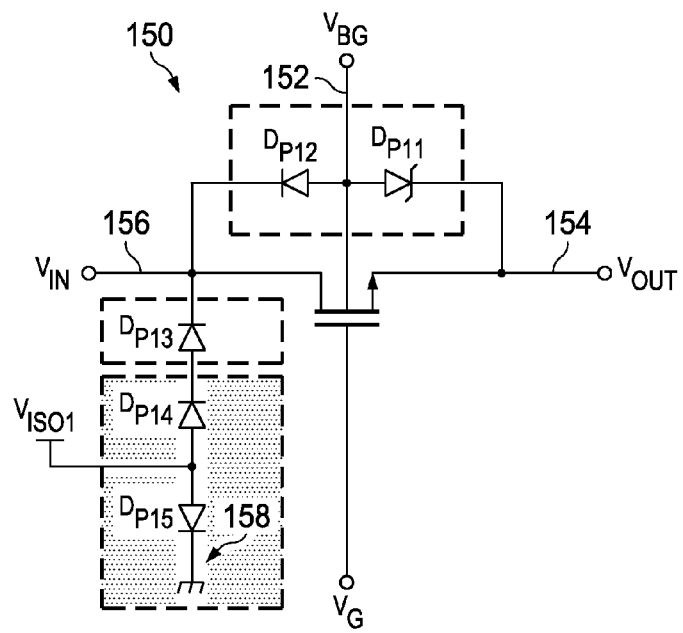
FIG. 4 illustrates an example of a power switch.

FIG. 4 illustrates an example of a power switch 150. The power switch 150 can correspond, for example, to the power switch 102 in the example of FIG. 3. Thus, the power switch 150 can be configured as an isolated LDMOS. The power switch 150 includes a first parasitic diode $D_{P11}$, demonstrated as a Zener diode, interconnecting a bulk connection 152 and a source 154 from anode to cathode, a second parasitic diode $D_{P12}$ interconnecting the bulk connection 152 and a drain 156 from anode to cathode, and a third parasitic diode $D_{P13}$ having a cathode coupled to the drain 156. In a typical LDMOS, the third parasitic diode $D_{P13}$ could have an anode coupled to a substrate. However, such an anode connection to the substrate in the typical LDMOS can result in a forward biasing of the third parasitic diode $D_{P13}$ during a reverse voltage condition, thus providing a latching current flow from the substrate to the drain.

To mitigate such a latching current flow, the power switch 150 can be fabricated as an isolated LDMOS, thus isolating the drain 156 from an associated substrate 158. In the example of FIG. 4, the fabrication of the power switch 150 as an isolated LDMOS can result in additional parasitic diodes $D_{P14}$ and $D_{P15}$. The parasitic diodes $D_{P14}$ and $D_{P15}$ are demonstrated in the example of FIG. 4 as oppositely connected in series, such that the parasitic diode $D_{P14}$ has a cathode coupled to an anode of the parasitic diode $D_{P13}$, and the parasitic diode $D_{P15}$ has a cathode coupled to the substrate 158. As an example, the parasitic diodes $D_{P14}$ and $D_{P15}$ can result from a deep N-well etching process during fabrication of the power switch 150. An isolation voltage $V_{ISO1}$ can be provided to the anodes of each of the parasitic diodes $D_{P14}$ and $D_{P15}$. As an example, the isolation voltage $V_{ISO1}$ can correspond to the output voltage $V_{OUT}$, or a variety of other voltages sufficient to set the parasitic diodes $D_{P14}$ and $D_{P15}$ in a forward bias state. Based on the arrangement and forward bias state of the parasitic diodes $D_{P14}$ and $D_{P15}$ based on the isolation voltage $V_{ISO1}$, current is substantially prevented from flowing from the substrate 158 to the drain 156 in the event of a reverse voltage condition.

Figure 5:
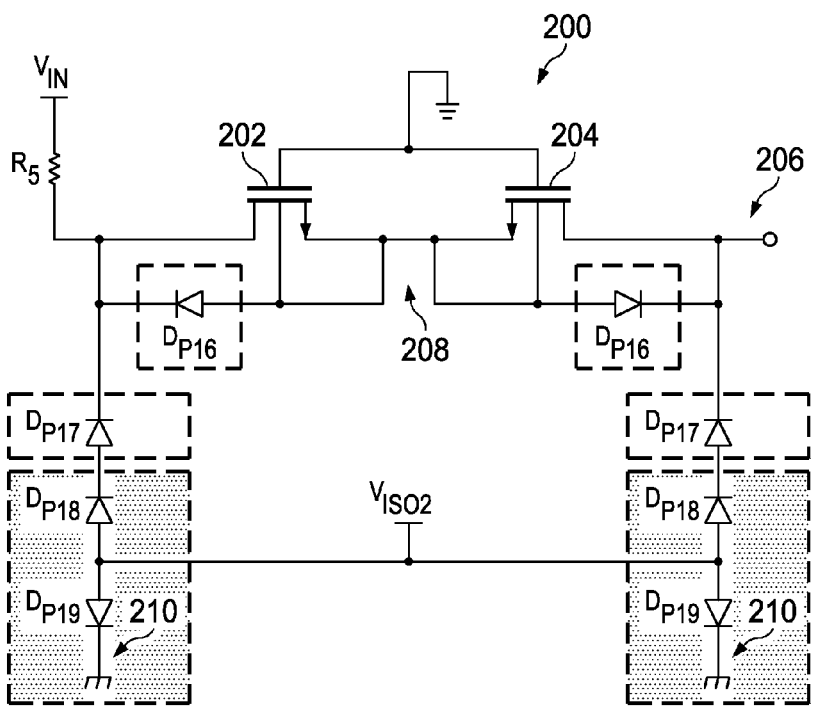
FIG. 5 illustrates an example of a reverse voltage control circuit.

FIG. 5 illustrates an example of a reverse voltage control circuit 200. As an example, the reverse voltage control circuit 200 can correspond to the reverse voltage gate control circuit 126 or the reverse voltage bulk control circuit 128 in the example of FIG. 3. Therefore, the reverse voltage control circuit 200 is configured to passively couple the input voltage $V_{IN}$ to the gate or bulk of the power switch 102 in response to the reverse voltage condition. In the example of FIG. 5, the reverse voltage gate control circuit 200 includes a first N-channel MOSFET 202 and a second N-channel MOSFET 204 that are connected in series and arranged opposite with respect to each other between the input voltage $V_{IN}$ (via a resistor $R_5$) and a node 206 that can be coupled to the gate or the bulk connection of the power switch 102. The first and second N-channel MOSFETs 202 and 204 are demonstrated as having commonly coupled sources at a node 208, and each of the first and second N-channel MOSFETs 202 and 204 have a gate coupled to ground. As an example, the N-channel MOSFETs 202 and 204 can be configured as isolated LDMOS transistors.

Additionally, each of the N-channel MOSFETs 202 and 204 include a first parasitic diode $D_{P16}$ interconnecting the node 208 and the respective drain from anode to cathode, respectively, and a second parasitic diode $D_{P17}$ having a cathode coupled to the drain of the respective N-channel MOSFET 202 and 204. Similar to as described previously in the example of FIG. 4, the N-channel MOSFETs 202 and 204 can each be fabricated as isolated LDMOS transistors to include additional parasitic diodes $D_{P18}$ and $D_{P19}$. The parasitic diodes $D_{P18}$ and $D_{P19}$ are demonstrated in the example of FIG. 5 as having a common anode connection in series, such that the parasitic diode $D_{P18}$ has a cathode coupled to an anode of the parasitic diode $D_{P17}$, and the parasitic diode $D_{P19}$ has a cathode coupled to a substrate 210. As an example, the parasitic diodes $D_{P18}$ and $D_{P19}$ can result from a deep N-well etching process during fabrication of the N-channel MOSFETs 202 and 204. An isolation voltage $V_{ISO2}$ can be provided to the anodes of each of the parasitic diodes $D_{P18}$ and $D_{P19}$. As an example, the isolation voltage $V_{ISO2}$ can correspond to any of a variety of voltages sufficient to set the parasitic diodes $D_{P18}$ and $D_{P19}$ in a forward bias state. Based on the arrangement and forward bias state of the parasitic diodes $D_{P18}$ and $D_{P19}$ based on the isolation voltage $V_{ISO2}$, current is substantially prevented from flowing from the substrate 210 to the respective drains of the N-channel MOSFETs 202 and 204 in the event of a reverse voltage condition.

What have been described above are examples of the invention. It is, of course, not possible to describe every conceivable combination of components or method for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims.

What is claimed is:

1. A power supply system comprising:
   a power switch device that is activated to provide an output voltage to a load in response to an input voltage, the power switch device comprising a control terminal and a bulk connection;
   a reverse voltage control circuit configured to couple the input voltage to one of the control terminal and the bulk connection in response to a reverse voltage condition in which an amplitude of the input voltage becomes negative; and
   an output shutoff circuit configured to couple the output voltage to a neutral-voltage rail during the reverse voltage condition.

2. The system of claim 1, wherein the reverse voltage control circuit comprises a pair of N-channel metal-oxide semiconductor field-effect transistors (MOSFETs) that are oppositely connected in series and are each passively activated in response to the reverse voltage condition to couple the input voltage to the one of the control terminal and the bulk connection.

3. The system of claim 2, wherein the pair of N-channel MOSFETs comprising source terminals that are respectively coupled to a common node, gate terminals that are respectively coupled to the neutral-voltage rail, and respective drain terminals that are coupled to the input voltage and to the control terminal, respectively, wherein the pair of N-channel MOSFETs are activated based on a voltage of the common node decreasing to a voltage that is less than the neutral-voltage rail via a parasitic diode associated with one of the pair of N-channel MOSFETs.

4. The system of claim 3, wherein the pair of N-channel MOSFETs are each fabricated to prevent a current flow from a substrate to the respective drain terminals during the reverse voltage condition.

5. The system of claim 4, wherein the pair of N-channel MOSFETs are configured as a pair of isolated lateral diffused metal oxide semiconductor (LDMOS) transistors that comprise a pair of cathode-coupled parasitic isolation diodes interconnecting the substrate and the respective drain terminals, the pair of cathode-coupled parasitic isolation diodes being reverse biased via an isolation voltage provided at respective cathodes of the pair of cathode-coupled parasitic isolation diodes to prevent the current flow from the substrate to the respective drain terminals during the reverse voltage condition.

6. The system of claim 1, wherein the reverse voltage control circuit is a reverse voltage gate control circuit configured to passively couple the input voltage to the control terminal of the power switch device during the reverse voltage condition,
   the system further comprising a reverse voltage bulk control circuit configured to passively couple the input voltage to the bulk connection of the power switch device in response to the reverse voltage condition.

7. The system of claim 1, wherein the power switch device is configured as an isolated lateral diffused metal oxide semiconductor (LDMOS) transistor that is fabricated to prevent a current flow from a substrate to a drain terminal in response to the reverse voltage condition, the drain terminal being coupled to the input voltage.

8. The system of claim 7, wherein the power switch device comprises a pair of cathode-coupled parasitic isolation diodes interconnecting the substrate and the drain terminal, the pair of cathode-coupled parasitic isolation diodes being reverse biased via an isolation voltage provided at respective cathodes of the pair of cathode-coupled parasitic isolation diodes to prevent the current flow from the substrate to the drain terminal during the reverse voltage condition.

9. The system of claim 1, wherein the output shutoff circuit comprises a P-channel metal-oxide semiconductor field-effect transistor (MOSFET) having a drain that is coupled to the output voltage, a gate terminal that is coupled to the bulk connection, and a source terminal that is coupled to the neutral-voltage rail, wherein the P-channel MOSFET is configured to activate to couple the output voltage to the neutral-voltage rail in response to a voltage associated with the bulk connection becoming negative during the reverse voltage condition.

10. The system of claim 9, wherein the P-channel MOSFET activates in response to the reverse voltage control circuit passively coupling the input voltage to the bulk connection during the reverse voltage condition.

11. A power supply system comprising:
    a power switch device that is activated to provide an output voltage to a load in response to an input voltage, the power switch device comprising a control terminal; and
    a reverse voltage control circuit comprising a pair of transistors that are oppositely connected in series and are each passively activated to couple the input voltage to the control terminal during a reverse voltage condition, the reverse voltage condition corresponding to a condition in which the input voltage becomes negative.

12. The system of claim 11, wherein the pair of transistors each comprise source terminals that are respectively coupled to a common node, gate terminals that are respectively coupled to a neutral-voltage rail, and drain terminals that are coupled to the input voltage and to the control terminal, respectively, wherein the pair of transistors are activated based on a voltage of the common node decreasing to less than a voltage of the neutral-voltage rail via a parasitic diode associated with one of the pair of transistors.

13. The system of claim 11, wherein the pair of transistors are configured as a pair of N-channel isolated lateral diffused metal oxide semiconductor (LDMOS) transistors fabricated to comprise a pair of cathode-coupled parasitic isolation diodes interconnecting the substrate and the respective drain terminals, the pair of cathode-coupled parasitic isolation diodes being reverse biased via an isolation voltage provided at respective cathodes of the pair of cathode-coupled parasitic isolation diodes to prevent a current flow from the substrate to the respective drain terminals during the reverse voltage condition.

14. The system of claim 11, wherein the power switch device is configured as an isolated lateral diffused metal oxide semiconductor (LDMOS) transistor that is fabricated to prevent a current flow from a substrate to a drain terminal during the reverse voltage condition, the drain terminal being coupled to the input voltage.

15. The system of claim 14, wherein the isolated LDMOS comprises a pair of cathode-coupled parasitic isolation diodes interconnecting the substrate and the drain terminal, the pair of cathode-coupled parasitic isolation diodes being reverse biased via an isolation voltage provided at respective cathodes of the pair of cathode-coupled parasitic isolation diodes to prevent the current flow from the substrate to the drain terminal during the reverse voltage condition.

16. A universal serial bus (USB) power supply system comprising the power supply system of claim 11, wherein the input voltage is provided from a USB receptacle, and wherein the reverse voltage condition corresponds to a reverse USB connection associated with the input voltage.

17. A power supply system comprising:
a power transistor that is activated to provide an output voltage to a load in response to an input voltage, the power transistor comprising a bulk connection; and
a reverse voltage control circuit comprising a pair of transistors that are connected in series and are each passively activated in response to a reverse voltage condition to couple the input voltage to the bulk connection of the power transistor, the reverse voltage condition corresponding to a condition in which the input voltage becomes negative.

18. The system of claim 17, wherein the pair of transistors each comprise source terminals that are respectively coupled to a common node, gate terminals that are respectively coupled to a neutral-voltage rail, and respective drain terminals that are coupled to the input voltage and to the bulk connection, respectively,
wherein the pair of transistors are activated based on a voltage of the common node decreasing to a voltage that is less than the neutral-voltage rail via a parasitic diode associated with one of the pair of transistors.

19. The system of claim 17, wherein the pair of transistors are configured as a pair of N-channel isolated lateral diffused metal oxide semiconductor (LDMOS) transistors fabricated to comprise a pair of cathode-coupled parasitic isolation diodes interconnecting the substrate and the respective drain terminals, the pair of cathode-coupled parasitic isolation diodes being reverse biased via an isolation voltage provided at respective cathodes of the pair of cathode-coupled parasitic isolation diodes to prevent a current flow from the substrate to the respective drain terminals during the reverse voltage condition.

20. The system of claim 17, wherein the power transistor is configured as an isolated lateral diffused metal oxide semiconductor (LDMOS) transistor that is fabricated to comprise a pair of cathode-coupled parasitic isolation diodes interconnecting a substrate and a drain terminal, the pair of cathode-coupled parasitic isolation diodes being reverse biased via an isolation voltage provided at respective cathodes of the pair of cathode-coupled parasitic isolation diodes to prevent a current flow from a substrate to the drain terminal during the reverse voltage condition.

21. The system of claim 17, further comprising an output shutoff circuit configured to couple the output voltage to a neutral-voltage rail in response to a voltage associated with the bulk connection becoming negative during the reverse voltage condition.

22. A universal serial bus (USB) power supply system comprising the power supply system of claim 17, wherein the input voltage is provided from a USB receptacle, and wherein the reverse voltage condition corresponds to a reverse USB connection associated with the input voltage.

* * * * *